(12) United States Patent
Zabel et al.

(10) Patent No.: US 8,047,073 B2
(45) Date of Patent: Nov. 1, 2011

(54) CAPACITIVE LIQUID LEVEL DETECTOR FOR DIRECT METHANOL FUEL CELL SYSTEMS

(75) Inventors: Andreas Zabel, Berlin (DE); Stefan Mergel, Düsseldorf (DE)

(73) Assignee: Samsung SDI Co., Ltd., Yongin-si (KR)

( * ) Notice: Subject to any disclaimer, the term of this patent is extended or adjusted under 35 U.S.C. 154(b) by 662 days.

(21) Appl. No.: 12/120,214

(22) Filed: May 13, 2008

(65) Prior Publication Data

US 2008/0282795 A1 Nov. 20, 2008

(30) Foreign Application Priority Data

May 14, 2007 (DE) .......................... 10 2007 022 873
May 8, 2008 (KR) .......................... 10-2008-0042994

(51) Int. Cl.
*G01F 23/26* (2006.01)
(52) U.S. Cl. .................. 73/304 C; 73/290 B; 73/290 R; 73/304 R
(58) Field of Classification Search ................ 73/290 B, 73/290 R, 290 V, 304 C, 304 R
See application file for complete search history.

(56) References Cited

U.S. PATENT DOCUMENTS

| | | | | |
|---|---|---|---|---|
| 2,923,157 A * | 2/1960 | Peifer | .............................. | 73/327 |
| 3,868,664 A * | 2/1975 | Hill | ................................ | 340/620 |
| 3,939,360 A * | 2/1976 | Jackson | ........................ | 307/118 |
| 3,991,614 A * | 11/1976 | Ditzler | ............................ | 73/215 |
| 4,119,860 A * | 10/1978 | Gooley | ......................... | 250/577 |
| 4,316,174 A * | 2/1982 | Sutton et al. | .................. | 340/438 |
| 4,389,889 A * | 6/1983 | Larson | ......................... | 73/304 C |
| 4,440,022 A * | 4/1984 | Masom | ......................... | 73/293 |
| 4,510,436 A * | 4/1985 | Raymond | ..................... | 324/690 |
| 4,567,762 A * | 2/1986 | Hopper et al. | ............. | 73/304 R |
| 4,594,893 A * | 6/1986 | Lombard et al. | ............ | 73/304 C |
| 4,603,581 A * | 8/1986 | Yamanoue et al. | ......... | 73/304 C |
| 4,638,305 A * | 1/1987 | Sutton | ........................... | 340/620 |
| 4,720,997 A * | 1/1988 | Doak et al. | ..................... | 73/295 |

(Continued)

FOREIGN PATENT DOCUMENTS

JP 56-019873 2/1981

(Continued)

OTHER PUBLICATIONS

KIPO Registration Determination Certificate dated Jun. 8, 2010, for priority Korean Patent application 10-2008-0042994.

*Primary Examiner* — David A. Rogers
(74) *Attorney, Agent, or Firm* — Christie, Parker & Hale, LLP (57) ABSTRACT

A capacitive liquid level detector for detecting a liquid level of a liquid in a receptacle, the liquid being conductive, the detector comprising: a capacitor with a first plate having a fixed size and being insulated from the liquid, and a second plate being formed by the liquid itself, its size being variable depending on the liquid level inside said receptacle, wherein a thin film dielectric layer is formed on the surface of the first plate and located between the first plate and the second plate, the first plate with the thin film dielectric layer formed on its surface is arranged such that it covers an open part of the outer wall of the receptacle, the first plate with the thin film dielectric layer formed on its surface is attached to the receptacle by sealing means in order to seal the receptacle against liquid leakage.

32 Claims, 4 Drawing Sheets

U.S. PATENT DOCUMENTS

| | | | |
|---|---|---|---|
| 4,890,490 A * | 1/1990 | Telford | 73/290 V |
| 5,017,909 A * | 5/1991 | Goekler | 340/620 |
| 5,051,921 A * | 9/1991 | Paglione | 702/52 |
| 5,122,922 A * | 6/1992 | Richeson | 361/284 |
| 5,182,545 A | 1/1993 | Goekler et al. | |
| 5,315,872 A * | 5/1994 | Moser | 73/304 C |
| 5,600,532 A * | 2/1997 | Michiya et al. | 361/305 |
| 5,923,524 A * | 7/1999 | Cava | 361/321.4 |
| 6,212,057 B1 * | 4/2001 | Kohara et al. | 361/301.4 |
| 6,943,566 B2 * | 9/2005 | Florin et al. | 324/662 |
| 7,127,943 B1 * | 10/2006 | Griffiths et al. | 73/304 C |
| 7,219,545 B2 * | 5/2007 | Salzmann et al. | 73/304 R |
| 7,533,566 B2 * | 5/2009 | Tung et al. | 73/290 B |
| 7,661,307 B1 * | 2/2010 | Milone | 73/304 R |
| 7,739,907 B2 * | 6/2010 | Boiarski | 73/149 |
| 7,798,586 B2 * | 9/2010 | Watanabe | 347/7 |
| 2001/0000851 A1 * | 5/2001 | Morimoto | 73/304 C |
| 2002/0116996 A1 * | 8/2002 | Malzahn | 73/290 R |
| 2002/0177268 A1 * | 11/2002 | Lu et al. | 438/200 |
| 2003/0213960 A1 * | 11/2003 | Kitagawa et al. | 257/71 |
| 2004/0005496 A1 * | 1/2004 | Kelley et al. | 429/91 |
| 2004/0224198 A1 * | 11/2004 | Ninomiya et al. | 429/22 |
| 2004/0226361 A1 * | 11/2004 | Usui et al. | 73/290 V |
| 2005/0039528 A1 * | 2/2005 | Wernet et al. | 73/304 C |
| 2005/0282348 A1 * | 12/2005 | Lee | 438/396 |
| 2007/0056367 A1 * | 3/2007 | Rumpf | 73/290 R |
| 2008/0003473 A1 * | 1/2008 | Tung et al. | 429/26 |
| 2008/0053202 A1 * | 3/2008 | Rohklin et al. | 73/61.41 |
| 2009/0165552 A1 * | 7/2009 | Sieh et al. | 73/304 C |

FOREIGN PATENT DOCUMENTS

| | | |
|---|---|---|
| JP | 61-265531 | 11/1986 |
| JP | 04-363629 | 12/1992 |

* cited by examiner

CAPACITIVE LIQUID LEVEL DETECTOR FOR DIRECT METHANOL FUEL CELL SYSTEMS

CROSS-REFERENCE TO RELATED PATENT APPLICATIONS

This application claims priority to and the benefit of German Patent Application No. 102007022873.4, filed on May 14, 2007, in the German Patent Office, and Korean Patent Application No. 10-2008-0042994, filed on May 8, 2008, in the Korean Intellectual Property Office, the disclosures of which are incorporated herein in their entirety by reference.

BACKGROUND OF THE INVENTION

1. Field of the Invention

The present invention relates to a direct methanol fuel cell system (DMFC), and, more particularly, to a capacitive liquid level detector for a DMFC.

2. Description of the Related Art

A fuel cell is a galvanic cell for converting the chemical reaction energy of continuously fed fuel and oxidant into electric energy. In general, a fuel cell includes two electrodes (or anode and cathode) separated by a membrane or by an electrolyte. The anode is surrounded by a flow of fuel, e.g., hydrogen, methane or methanol; and the fuel is oxidized there. The cathode is surrounded by a flow of oxidant, e.g., oxygen or hydrogen peroxide, which is reduced at this electrode. Depending on the type of fuel cell, the materials used to realize these components are to be selected differently.

Compact direct methanol fuel cells (DMFC) systems are currently in the focus of development in many electronics companies. They are expected to replace or append the power supply of mobile electronics devices because they allow longer operating times and a quicker recharge. A direct methanol fuel cell is a low-temperature fuel cell which is operative in a low temperature range of from about 60 to about 120° C. This type of cell utilizes a polymer membrane as electrolyte. Methanol ($CH_3OH$), with no previous reforming, is supplied directly to the anode together with water to be oxidized there. Carbon dioxide ($CO_2$) is formed as waste gas at the anode. Atmospheric oxygen supplied to the cathode as oxidant reacts with H+ ions and electrons to form water. The advantage of the DMFC lies in the use of a liquid, easy-to-store and very inexpensive source of energy, which can be distributed in plastic cartridges, for example. Moreover, a vastly branched infrastructure for methanol is already existing in many fields, e.g., through the use as anti-freeze additive in windshield washer fluids for motor vehicles. Depending on the design, this type of fuel cell can provide power ranging from some mW up to several 100 kW. More specifically, DMFCs are suitable for portable use as substitutes and supplements for conventional accumulators in electronic devices. Typical fields of use are in telecommunication and power supply of notebooks.

The oxidation of methanol on the catalyst of the anode proceeds step by step, and several reaction pathways with various intermediate products are being discussed. To maintain high efficiency of the fuel cell, rapid removal of the reaction products from the region around the electrode is required. As a result of the temperatures being encountered and the chemistry that constitutes the basis, a liquid/gas mixture of $CO_2$, water, water vapor and non-reacted methanol is formed. Water and methanol should be recovered from this liquid/gas mixture so as to maintain self-sufficiency of the system for as long as possible. Furthermore, $CO_2$ must be removed from the equilibrium. This is done by utilizing a $CO_2$ separator. The $CO_2$ should be removed from this liquid/gas mixture in order to re-feed the liquid fuel mixture to the anode after adjusting the methanol concentration. Separation of the gases is effected by utilizing a $CO_2$ separator.

Similarly, a liquid/gas mixture is formed at the cathode, including non-consumed air, water and water vapor. To achieve long-lasting self-sufficiency of the system, as much water as possible must be separated from the liquid/gas mixture and the liquid/gas mixture from which water is separated must be re-fed into the cathode cycle. To this end, a heat exchanger is arranged downstream of the cathode outlet of the fuel cell so as to cool the mixture and achieve condensation of the water vapor.

Arranged downstream of the heat exchanger is an air separator separating the air stream from liquid water so as to re-feed the water into the anode cycle. Accordingly, the separators are mainly used in water management and to remove $CO_2$ from the equilibrium. Conventional separators separate the phase mixture of liquid and gaseous or vaporous components and release the gaseous or vaporous components into the environment.

Amongst other things, a liquid storage tank is necessary for a stable system operation. The liquid level inside this tank should be known to (or determined by) the system in order to control the amount of water to be recycled.

A continuous level measurement is very beneficial for the system control as it renders possible to implement common proportional-integral-derivative (PID) control algorithms into the control software allowing a faster and better controlled reaction on changes in the system.

Liquid level measuring in small receptacles is a difficult matter. Common problems are the reliability and accuracy of the measured signal. Most of the established measuring principles are only usable in more or less large tanks.

Common capacitive measuring principles use the liquid as the dielectric between the capacitor plates. Some inventions incorporate a set of plates which dive (or are submerged) into the liquid, in other examples the plates are arranged at the exterior of receptacles.

As an example, a liquid level sensor is disclosed in U.S. Pat. No. 5,182,545. As a liquid rises and falls in the container, the dielectric effect of the liquid changes the effective capacitance of a sensing capacitor which is detected by electronic circuitry coupled to the sensor. One plate of the sensor capacitor is a probe disposed within a receptacle while a grounded conductive portion of the receptacle is a second plate of the capacitor.

A non-intrusive fluid level detector including a single point capacitive sensor mounted on the outside surface of a receptacle is disclosed in U.S. Pat. No. 5,017,909. A non-conductive container or a non-conductive window in a conductive container is used to place the sensor having insulated plates which are not in direct contact with the liquid. The sensor assembly is disposed on the exterior wall of the receptacle.

Both, U.S. Pat. No. 5,182,545 and U.S. Pat. No. 5,017,909 employ the fluid as the dielectric of the capacitor. However, since the capacitance of a plate capacitor is inversely-proportional to the distance between the plates, the use of the fluid as the dielectric and/or the placement of the plates on the exterior of the plates leads to a large plate distance and thus such a sensor leads to the disadvantage that the capacity and the capacity variation to be measured are very small. The small capacity results from the small plate area and the relatively large distance between them. Relatively expensive measuring electronics are required, and the measured signal is relatively inaccurate and also subject to influences from outer electrical fields.

U.S. Pat. No. 6,943,566 discloses a sensor applied to a wall of a container or integrated into the container. The wall of the container made of plastic or glass-fiber constitutes the dielectric, and the conductive fluid itself constitutes the second plate, i.e., the capacitor consists of a sensor plate and the contents of the container. However, because the wall made of plastic or glass-fiber forms the dielectric and the wall needs to be thick enough to contain the liquid inside, i.e., at least several millimeters, the distance between the plates is still significant and the capacitance is still low. Furthermore, no metallic parts are allowed to be present between the sensor plate and the fluid, because otherwise these metallic parts have an effect on the capacitance of the system. The precision and linearity of the measurement depends on the thickness and the uniformity of the dielectric constant of the wall material over the entire area of the sensor plate. The latter is difficult to achieve with common manufacturing methods of plastics.

SUMMARY OF THE INVENTION

The present invention provides a capacitive liquid level detector which allows the measurement of a liquid level of a liquid with high precision.

The present invention also provides a capacitive liquid level detector with high capacitance for measurement.

The present invention also provides a capacitive liquid level detector which allows the use of inexpensive detection circuitry.

According to an embodiment of the present invention, there is provided a capacitive liquid level detector for detecting a liquid level of a liquid in a receptacle, the liquid being conductive, the detector comprising: a capacitor with a first plate having a fixed size and being insulated from the liquid, and a second plate being formed by the liquid itself, its size being variable depending on the liquid level inside said receptacle, wherein a thin film dielectric layer is formed on the surface of the first plate and located between the first plate and the second plate, the first plate with the thin film dielectric layer formed on its surface is arranged such that it covers an open part of the outer wall of the receptacle, the first plate with the thin film dielectric layer formed on its surface is attached to the receptacle by sealing means in order to seal the receptacle against liquid leakage.

By employing a thin film dielectric layer on the first plate, the distance between the capacitor plates is significantly reduced, preferably to some micrometers the added thickness of the thin film dielectric layer of the fixed plate. The capacity and the capacity variation rise up proportionally or linearly with the reduction of the distance. A higher capacity by a factor of, for instance, $10^3$ can be reached as compared to existing measurement devices making the measured signal much more reliable, accurate and independent from outer electrical fields.

The capacitive liquid level detector may further include: a thin film passivation layer provided on said dielectric layer between the dielectric layer and the second plate to protect from liquid permeation into and through the dielectric layer.

Both layers each may provide insulation of the first plate with respect to the liquid.

The thin film passivation layer may be hydrophobic. This prevents an occurrence of a measurement error during a decrease of a liquid level due to the adhesion of the liquid to the surface of the passivation layer.

The surface of the liquid being in contact with the dielectric layer may constitute the second plate of the detector.

The sealing means may cover the edge portions of the thin film dielectric layer formed on the first plate and attach the thin film dielectric layer to the receptacle such that the first plate is not in contact with the liquid. The sealing means also may cover the edge portions of the thin film passivation layer formed on the thin film dielectric layer and attach the thin film passivation layer to the receptacle such that the first plate is not in contact with the liquid.

The open part of the outer wall of the receptacle may be a hole in a side wall of said receptacle. The upper end of said hole may correspond to a maximum liquid level of the receptacle and the lower end of said hole may correspond to a minimum liquid level of the receptacle. The sealing means may attach the first plate with the thin film dielectric layer formed on its surface to locations above the upper end and below the lower end of the hole that is the open part of the outer wall of the receptacle.

The open part of the outer wall of the receptacle may have a size of an entire side wall of the receptacle. The first plate with the thin film dielectric layer formed on its surface may be attached to the open edges of the receptacle defining the pen part of the outer wall (or formed by the missing side wall) by the sealing means.

The sealing means may include a sealant or glue.

The dielectric constant of the thin film dielectric layer may be constant over the entire surface of the first plate.

The first plate may be provided with a first electrical contact to contact the first plate and the second plate is provided with a second electrical contact. The second electrical contact may be provided by a contacting electrode shaped to have permanent contact to the liquid. The second electrical contact may be provided at the bottom of the receptacle. The second electrical contact may be realized as a wire reaching to an inner portion of the bottom of the receptacle. The second electrical contact may be realized as a metal plate provided on an inner portion of the bottom of the receptacle. The second electrical contact may be realized as a wire frame on the inner edge portions of the receptacle such that the wire frame is disposed to contact the liquid in any orientation of the receptacle. The second electrical contact may be realized as a metal plate inserted into a window of the bottom of the receptacle or one side of the receptacle. The second electrical contact may be realized as multiple metal plates arranged to contact the liquid in any orientation of the receptacle. The second contact may be provided at an inlet of the receptacle.

The first plate may be provided by a polished stainless steel sheet.

The thin film dielectric layer may be a sputtered $TiO_2$ layer in order to achieve a high capacity because of the large dielectric constant of $TiO_2$.

The passivation layer may be a sputtered $SiO_2$, $Si_3N_4$ or $SiO_xN_y$ layer, or a spincoated lacquer layer utilizing chemical resistant photo lithography lacquers. This advantageously ensures a longterm chemical stability and inhibits permeation of liquids into the dielectric layer.

The distance between the first plate and the second plate may be less than about 70 µm. The distance between the first plate and the second plate may be 1 to 10 µm.

The thickness of the thin film dielectric layer may be less than about 50 µm. The thickness of the thin film dielectric layer may range from 0.5 to 5 µm.

The thickness of the thin film passivation layer may be less than about 20 µm. The thickness of the thin film passivation layer may range from 0.5 to 5 µm.

The thin film dielectric layer may be provided with a dielectric constant of at least 20. The thin film dielectric layer may be provided with a dielectric constant of at least 80.

The receptacle may be a liquid storage tank or a mixer of a direct methanol fuel cell system.

Further advantageous embodiments of the invention are subject of the dependent claims which may be implemented individually or in any combination.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

The present invention will now be described more fully with reference to the accompanying drawings, in which exemplary embodiments of the invention are shown.

Figure 1:
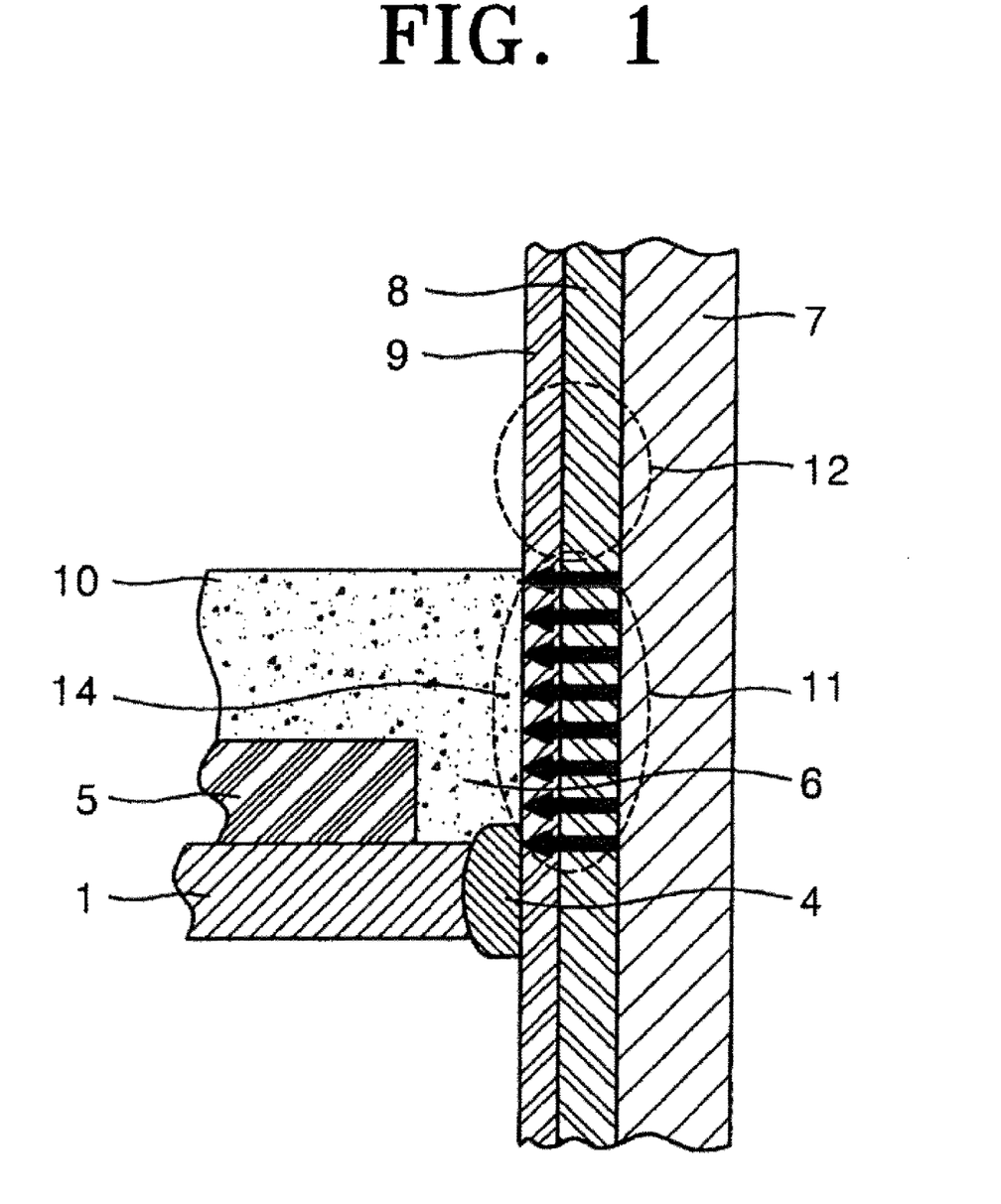
FIG. 1 shows a basic structure of a sensor satisfying the basic measurement principle applied to the present invention.

FIG. 1 shows a basic structure of a sensor satisfying the basic measurement principle applied to the present invention.

A basic aspect (idea) of the invention is to deposit a thin, well defined and isolating dielectric layer 8 on a fixed plate (or a sensor electrode) 7 by utilizing well defined layer deposition methods. Through the small thickness of the thin film dielectric layer 8, preferably between from about 0.5 to about 5 micrometer, a high capacitance of the capacitor is achieved. The use of the thin film dielectric layer 8 allows the use of materials having a high dielectric constant, like e.g., $TiO_2$, which again increases the capacitance and the measurement precision.

The capacitance of a plate capacitor is equal to:

$$C = \varepsilon_0 \varepsilon_r \frac{A}{d},$$

wherein
$\varepsilon_0$=vacuum dielectric constant
$\varepsilon_r$=dielectric constant of the dielectric
A=area
d=distance of the capacitor plates.

A thin film passivation layer 9 may be deposited on the thin film dielectric layer 8 in order to prevent (or protect from) erosion of the thin film dielectric layer material.

In the present embodiment, the distance between the capacitor plates is reduced by utilizing the liquid itself as one "liquid plate" of the plate capacitor and by utilizing a thin film layer structure as the dielectric of the plate capacitor.

As a measuring principle of an embodiment of the present invention, an electrolytic capacitor includes: a fixed plate 7 with a fixed area, which corresponds to a first plate of the electrolytic capacitor (which is insulated by the thin film dielectric layer 8 and, in one embodiment, also insulated by the thin film passivation layer 9, from the liquid 6); and the liquid 6 itself as a "liquid plate" 14 with a variable area, which corresponds to a second plate of the electrolytic capacitor, depending on a liquid level 10. A contacting electrode 5 contacts the liquid 6. The liquid 6 needs to be conductive. Thus the capacity of the electrolytic capacitor depends on the area of the liquid plate 14 and thus further on the liquid level 10. Upon application of a voltage source to the plates, an electric field forms in the area of the liquid plate 14 below the fluid level 10. To measure the capacity, both plates should be contacted. The fixed plate 7 can be contacted directly. The liquid plate 14 uses the contacting electrode 5 shaped in order to have contact to the liquid 6.

By reducing the distance between the fixed plate 7 and the liquid plate 14 forming the electrolytic capacitor to some micrometers corresponding to the thickness of the thin film dielectric layer 8 or the thicknesses of the thin film dielectric layer 8 and the thin film passivation layer 9 formed on the fixed plate 7, the capacity and the capacity variation rise up proportionally and/or linearly with the reduction of the plate distance. A higher capacity by a factor of $10^3$ can be reached as compared to the existing measuring principles as disclosed, e.g., in U.S. Pat. No. 6,943,566, making the measured signal much more reliable, accurate and independent as compared to that from outer electrical fields. A factor of 100 increases can result from the small thickness of the dielectric (10 μm) in comparison to the thickness of a tank wall of 1 mm. A further factor of 10 increases can follow from the dielectric constant of $TiO_2$ of 86 in comparison to that of plastics (e.g. ABS: 4.3, PVC: 3.4), wherein the effective dielectric constant of the layered structure is smaller than that of pure $TiO_2$. Thus, low cost capacity measurement circuits and inexpensive (or cheap) multimeters can be used. The thin film dielectric layer 8 and the thin film passivation layer 9, which are coated on the fixed plate 7, fulfill the following functions: first, the thin film dielectric layer 8 and the thin film passivation layer 9 realize a high dielectric constant and thus achieve a high capacity, and second the thin film passivation layer 9 prevents (or blocks) liquid permeation into and through the thin film dielectric layer 8.

To achieve highly dense and defect free thin film coatings, the substrate, here the fixed plate 7, may have a polished surface with a very low roughness and the use of high energy coating processes such as magnetron sputtering may be appropriate.

The minimum thickness of the thin film dielectric layer 8 is determined by the evenness of the deposition method, i.e., no pinholes should be formed. The maximum thickness should be about 50 μm. The capacitance of the sensor with an area of 1 $cm^2$ with $TiO_2$ as the dielectric is then equal to 1 nF. The thickness may range from 0.5 to 5 μm leading to a capacitance between from 140 to 14 nF (area: 1 $cm^2$).

The thickness of the thin film passivation layer 9 may be less than 20 μm, preferably between from 0.5 to 5 μm.

Figure 2:
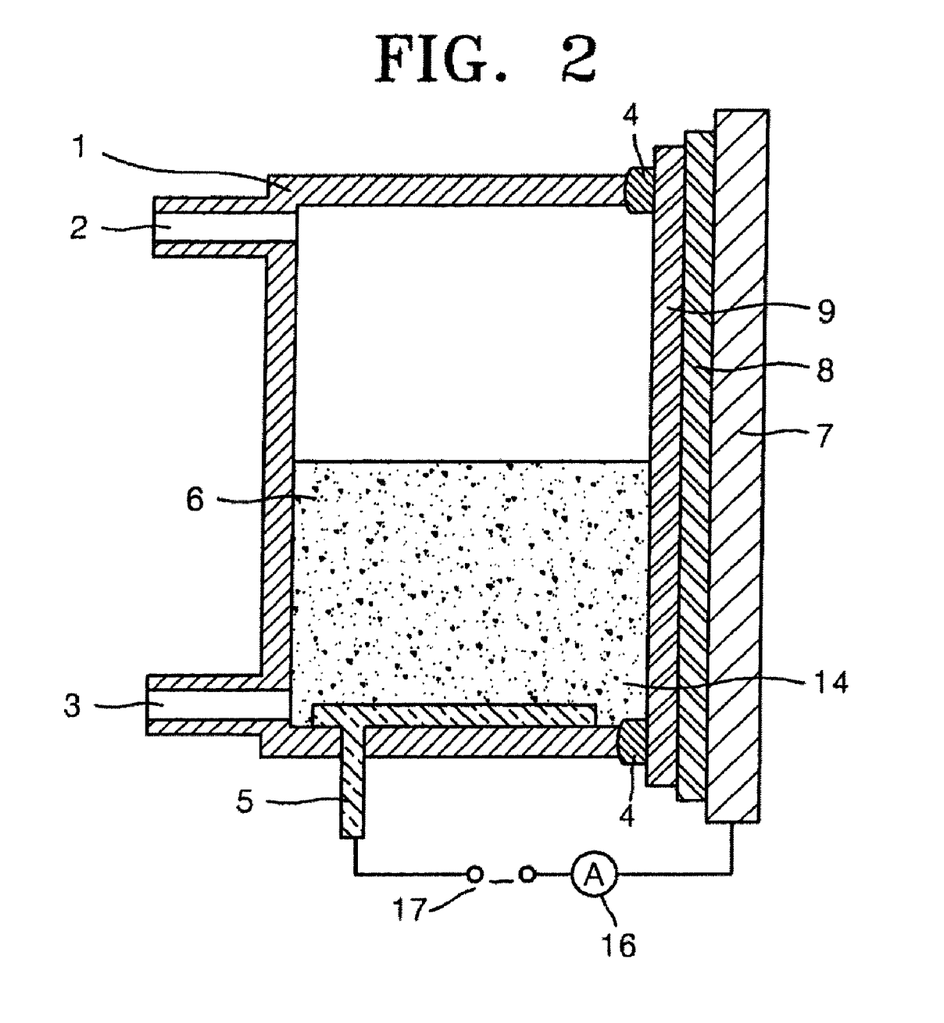
FIG. 2 shows an entire side wall of a receptacle used as a capacitor according to an embodiment of the present invention.

Thus, the distance between the first plate 7 that is the fixed plate and the second plate 14 that is the liquid plate 14 may be less than 70 μm, and even more preferably ranges from 1 to 10 μm. The complete measuring set-up with a simple method to measure the capacitance includes an AC current source 17 for supplying a voltage V at a Frequency f as shown in FIG. 2. The two electrical contacts of the AC current source 17 are connected to the first plate 7 and the fluid contacting electrode 5 respectively. An AC current meter 16 is mounted in the circuit.

On a positive sine wave of the AC current source 17 having the positive voltage at the contacting electrode 5 and the negative voltage at the first plate 7, a positive charge is induced at the interface between the first plate 7 and the thin film dielectric layer 8, and a negative charge is induced at the interface between the second plate 14 and the thin film passivation layer 9. The resulting dipole field 11 is shown in FIG. 1 by the arrows.

When the AC voltage is reversed, current flows from the fixed plate (or first plate) 7 to the liquid plate (or second plate) 14 and reverses the dipole field 11. The flowing current is measured by an AC current meter 16. The measured current I is proportional to the AC voltage V, the frequency f and the capacity C of the sensor.

$$I = V*2\pi f*C.$$

By knowing the geometrical conditions of the sensor, the wetted area of the capacitor, i.e., the filling level can be calculated.

Alternatively, any other methods for determining a capacity can be applied.

Referring to FIG. 2, a receptacle 1 is a DMFC mixer tank with an air outlet 2 and a fluid inlet 3. The receptacle 1 has an open structure and includes only three side walls, wherein the wall opposite to the wall with the outlet 2 and inlet 3 is missing. The layered structure with the fixed plated (or first plate) 7, the thin film dielectric layer 8 and the thin film passivation layer 9 is glued to this open structure and the open edges of the top wall and the bottom wall. A sealant or glue (or sealing means) 4 prevents (or blocks) the liquid 6 from leaking out of the receptacle 1 and also ensures that the first plate 7 is not in contact with the liquid 6. The contact electrode 5 is formed on the bottom wall and reaches through the bottom wall to form a contact to the environment. The thin film dielectric layer 8 may cover one side of the first plate 7 facing the liquid 6 completely, and the thin film passivation layer 9, if applied, covers the thin film dielectric layer 7 completely. However, the thin film dielectric layer 8 and the thin film passivation layer 9 can also leave edges (or edge portions) of the first plate 7 open, but, in this case, it then needs to be assured that the sealent (or glue) 4 is arranged to prevent (or block) the first plate 7 from contact with the liquid 6.

Figure 3:
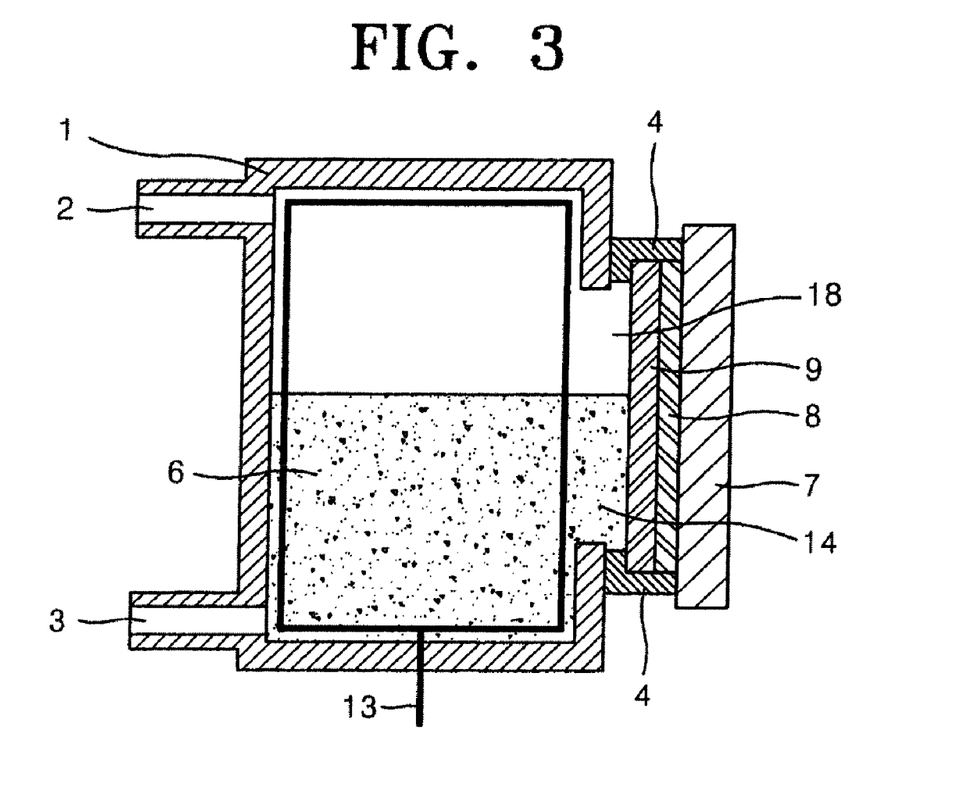
FIG. 3 shows a window in a receptacle and a wire frame as an electrical contact according to an embodiment of the present invention.

In order to reduce the size of the sensor, only a fraction of one face of the receptacle can be covered by the first plate 7 as shown in FIG. 3. For this, a window 18 in one face of the receptacle is provided (or left open). The lower and upper edges of the window may be about equal to the minimum and maximum allowed liquid level inside the receptacle, respectably, i.e., the measuring range of the sensor is defined by the window 18.

The first plate 7 covered with the thin film dielectric layer 8 and the thin film passivation layer 9 is attached to the outer surface of the receptacle using the sealant (or glue) 4. The advantage of this arrangement is that the sealant (or glue) 4 can be in contact with the first plate 7—which assures a good mechanical attachment of the sensor electrode—while covering the edges (or edge portions) of the thin film dielectric layer 8 and the thin film passivation layer 9—which prevents (or blocks) a contact (short circuit) of the liquid 6 with the first plate 7 and corrosive attacks of the liquid 6 towards the thin film dielectric layer 8 and the material of the first plate 7.

A wire frame 13 is arranged inside the receptacle 1 in a way that when the receptacle 1 is tilted towards the viewer or away from the viewer still at least one part of the wire frame 13 remains in contact with the liquid 6. Thus, the sensor also works for different orientations.

Figure 4:
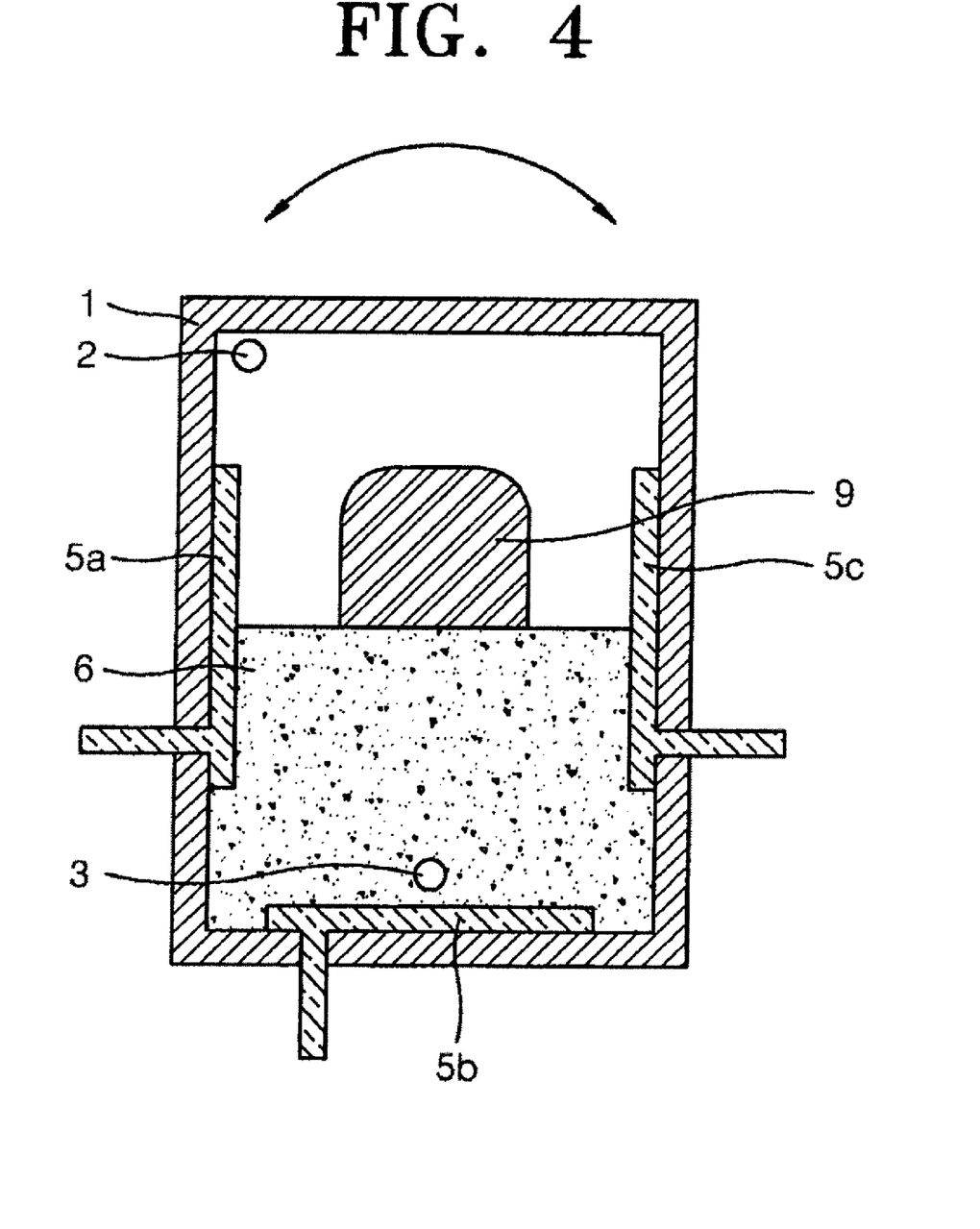
FIG. 4 shows a contacting electrode formed as multiple metal plates according to an embodiment of the present invention.

For achieving an operation of the sensor under different orientations also, a contacting electrode including multiple metal plates 5a, 5b, 5c can be employed, as shown in FIG. 4. Referring to FIG. 4, the first plate 7 covered with the thin film dielectric layer and the thin film passivation layer 9 is attached to the back side of the receptacle 1. In this view, only the thin film passivation layer 9 is visible. When the multiple metal plates are arranged at the left 5a, bottom 5b and right 5c wall of the receptacle 1, the latter can be tilted as indicated by the arrow. As such, in all orientations under +/−90° the level measurement is working.

The arrangement of the receptacle 1 with an open part and a layered structure including the first plate 7 and the thin film dielectric layer 8 (and optionally with the thin film passivation layer 9) attached to the receptacle 1 by the sealant (or glue) 4 allows the manufacturing of the detector in two different steps thus increasing the manufacturing flexibility.

The material of the thin film passivation layer 9 may be hydrophobic (or slightly or suitably hydrophobic) in order to decrease the adhesion of the liquid to the thin film passivation layer 9 during rise and fall of the liquid level leading to an incorrect measurement of the liquid level.

The first plate 7 could be designed as one complete side of the receptacle 1, or an inserted part into a window in one side of the receptacle 1.

The receptacle 1 could be a tank or a mixer tank of a DMFC fuel cell. The tank could be made of a polished stainless steel sheet.

The contacting electrode 5 could be designed as a wire reaching to the inside bottom of the receptacle 1, or a metal plate could be utilized on the inside bottom of the receptacle 1, or the wire frame 13 could be utilized on the inside edges of the receptacle 1 to contact the liquid in any orientation, or a metal plate could be inserted into a window of the bottom or one side of the receptacle 1, or multiple metal plates could be utilized to contact the liquid in any orientation.

The thin film dielectric layer 8 could be a sputtered $TiO_2$ layer in order to get a high capacity due to the high dielectric constant of $TiO_2$.

The thin film passivation layer 9 could be a sputtered SiO2, Si3N4 or SiOxNy layer in order to guarantee longterm chemical stability and inhibit permeation of liquids into the thin film dielectric layer or a spincoated lacquer layer using chemical resistant photo lithography lacquers.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A capacitive liquid level detector for detecting a liquid level of a liquid in a receptacle, the liquid being conductive, the detector comprising: a capacitor with a first plate having a fixed size and being insulated from the liquid, and a second plate being the liquid itself, the second plate having a size that varies depending on the liquid level inside the receptacle,
   wherein a thin film dielectric layer is on a surface of the first plate and located between the first plate and the second plate,
   a thin film passivation layer is between the dielectric layer and the second plate,
   the first plate having the thin film dielectric layer on its surface is arranged such that it covers an open part of an outer wall of the receptacle, the first plate having the thin film dielectric layer on its surface is attached to the receptacle by sealing means in order to seal the receptacle against liquid leakage, and the thin film passivation layer is a sputtered $SiO_2$, $Si_3N_4$ or $SiO_xN_y$, layer, or a spincoated lacquer layer utilizing chemical resistant photo lithography lacquers.

2. The capacitive liquid level detector according to claim 1, wherein the thin film passivation layer is hydrophobic.

3. The capacitive liquid level detector according to claim 1, wherein a surface of the liquid in contact with the passivation layer constitutes the second plate of the detector.

4. The capacitive liquid level detector according to claim 1, wherein the sealing means covers edge portions of the passivation layer on the first plate and attaches the passivation layer to the receptacle such that the first plate is not in contact with the liquid.

5. The capacitive liquid level detector according to claim 1, wherein the sealing means covers edge portions of the thin film dielectric layer and the thin film passivation layer on the thin film dielectric layer and attaches the thin film passivation layer to the receptacle such that the first plate is not in contact with the liquid.

6. The capacitive liquid level detector according to claim 1, wherein the sealing means comprises a sealant or glue.

7. The capacitive liquid level detector according to claim 1, wherein a dielectric constant of the thin film dielectric layer is constant over an entire surface of the first plate.

8. The capacitive liquid level detector according to claim 1, wherein the first plate comprises a polished stainless steel sheet.

9. The capacitive liquid level detector according to claim 1, wherein the thin film dielectric layer is a sputtered $TiO_2$ layer.

10. The capacitive liquid level detector according to claim 1, wherein a distance between the first plate and the second plate is less than about 70 μm.

11. The capacitive liquid level detector according to claim 1, wherein a distance between the first plate and the second plate ranges from about 1 to about 10 μm.

12. The capacitive liquid level detector according to claim 1, wherein a thickness of the thin film dielectric layer is less than at most about 50 μm.

13. The capacitive liquid level detector according to claim 1, wherein a thickness of the thin film dielectric layer ranges from about 0.5 to about 5 μm.

14. The capacitive liquid level detector according to claim 1, wherein a thickness of the thin film passivation layer is at least about 0.5 μm and less than about 20 μm.

15. The capacitive liquid level detector according to claim 1, wherein a thickness of the thin film passivation layer ranges from about 0.5 to about 5 μm.

16. The capacitive liquid level detector according to claim 1, wherein the thin film dielectric layer has a dielectric constant of at least about 20.

17. The capacitive liquid level detector according to claim 1, wherein the thin film dielectric layer has a dielectric constant of at least about 80.

18. The capacitive liquid level detector according to claim 1, wherein the receptacle is a liquid storage tank of a direct methanol fuel cell system.

19. The capacitive liquid level detector according to claim 1, wherein the open part of the outer wall of the receptacle is a hole in a side wall of the receptacle.

20. The capacitive liquid level detector according to claim 19, wherein an upper end of the hole corresponds to a maximum liquid level of the receptacle and a lower end of the hole corresponds to a minimum liquid level of the receptacle.

21. The capacitive liquid level detector according to claim 19, wherein the sealing means attaches the first plate having the thin film dielectric layer on its surface to locations above an upper end and below a lower end of the hole that is the open part of the outer wall of the receptacle.

22. The capacitive liquid level detector according to claim 1, wherein the open part of the outer wall of the receptacle has a size of an entire side wall of the receptacle.

23. The capacitive liquid level detector according to claim 22, wherein the first plate having the thin film dielectric layer on its surface is attached to open edges of the receptacle defining the open part of the outer wall by the sealing means.

24. The capacitive liquid level detector according to claim 1, wherein the first plate is provided with a first electrical contact to contact the first plate and the second plate is provided with a second electrical contact.

25. The capacitive liquid level detector according to claim 24, wherein the second electrical contact comprises a contacting electrode shaped to be in permanent contact with the liquid.

26. The capacitive liquid level detector according to claim 25, wherein the second electrical contact comprises a wire frame on inner edge portions of the receptacle such that the wire frame is disposed to contact the liquid in any orientation of the receptacle.

27. The capacitive liquid level detector according to claim 25, wherein the second electrical contact comprises a metal plate inserted into a window of the bottom of the receptacle or one side of the receptacle.

28. The capacitive liquid level detector according to claim 25, wherein the second electrical contact comprises multiple metal plates arranged to contact the liquid in any orientation of the receptacle.

29. The capacitive liquid level detector according to claim 25, wherein the second electrical contact is at an inlet of the receptacle.

30. The capacitive liquid level detector according to claim 25, wherein the second electrical contact is disposed at the bottom of the receptacle.

31. The capacitive liquid level detector according to claim 30, wherein the second electrical contact comprises a wire reaching to an inner portion of the bottom of the receptacle.

32. The capacitive liquid level detector according to claim 30,
wherein the second electrical contact comprises a metal plate on an inner portion of the bottom of the receptacle.

* * * * *